US012299494B2

(12) United States Patent
Tsirkin et al.

(10) Patent No.: US 12,299,494 B2
(45) Date of Patent: May 13, 2025

(54) MEMORY BARRIER ELISION FOR MULTI-THREADED WORKLOADS

(71) Applicant: Red Hat, Inc., Raleigh, NC (US)

(72) Inventors: Michael Tsirkin, Westford, MA (US); Andrea Arcangeli, New York, NY (US)

(73) Assignee: Red Hat, Inc., Raleigh, NC (US)

( * ) Notice: Subject to any disclaimer, the term of this patent is extended or adjusted under 35 U.S.C. 154(b) by 423 days.

(21) Appl. No.: 17/947,435

(22) Filed: Sep. 19, 2022

(65) Prior Publication Data

US 2023/0019377 A1    Jan. 19, 2023

Related U.S. Application Data

(63) Continuation-in-part of application No. 16/586,099, filed on Sep. 27, 2019, now Pat. No. 11,449,339.

(51) Int. Cl.
*G06F 9/50* (2006.01)
*G06F 9/30* (2018.01)
*G06F 9/38* (2018.01)
*G06F 9/52* (2006.01)

(52) U.S. Cl.
CPC .......... *G06F 9/5038* (2013.01); *G06F 9/3009* (2013.01); *G06F 9/3851* (2013.01); *G06F 9/5044* (2013.01); *G06F 9/522* (2013.01)

(58) Field of Classification Search
None
See application file for complete search history.

(56) References Cited

U.S. PATENT DOCUMENTS

| | | | |
|---|---|---|---|
| 5,914,874 A * | 6/1999 | Nohara | G06F 11/1438 718/1 |
| 6,510,448 B1 * | 1/2003 | Churchyard | G06F 9/45504 712/228 |
| 6,697,834 B1 | 2/2004 | Dice | |
| 2004/0260726 A1 | 12/2004 | Hrle et al. | |
| 2008/0104595 A1 | 5/2008 | Kawachiya et al. | |
| 2009/0094582 A1 * | 4/2009 | Craft | G06F 9/4862 717/127 |
| 2012/0297394 A1 | 11/2012 | Allen et al. | |
| 2014/0282564 A1 | 9/2014 | Almog | |
| 2014/0365734 A1 | 12/2014 | Bridge | |
| 2015/0160967 A1 | 6/2015 | Mason | |

(Continued)

OTHER PUBLICATIONS

Dave Dice, Maurice Herlihy, Alex Kohan; "Fast Non-intrusive Memory Reclamation for Highly-Concurrent Data Structures"; Brown University and Oracle Labs, USA; Accessed on or before Jun. 24, 2019; (10 Pages).

*Primary Examiner* — Adam Lee
(74) *Attorney, Agent, or Firm* — Kilpatrick Townsend & Stockton LLP

(57) ABSTRACT

A system includes a memory, at least one physical processor in communication with the memory, and a plurality of threads executing on the at least one physical processor. A first thread of the plurality of threads is configured to execute a plurality of instructions that includes a restartable sequence. Responsive to a different second thread in communication with the first thread being pre-empted while the first thread is executing the restartable sequence, the first thread is configured to restart the restartable sequence prior to reaching a memory barrier.

20 Claims, 8 Drawing Sheets

(56) References Cited

U.S. PATENT DOCUMENTS

| | | | |
|---|---|---|---|
| 2016/0188381 A1* | 6/2016 | Decker | G06F 9/52 |
| | | | 718/106 |
| 2018/0239604 A1 | 8/2018 | Cain et al. | |
| 2020/0104397 A1 | 4/2020 | Fan et al. | |
| 2020/0192720 A1 | 6/2020 | Liu | |

* cited by examiner

MEMORY BARRIER ELISION FOR MULTI-THREADED WORKLOADS

CROSS REFERENCE TO RELATED APPLICATIONS

This application is a continuation-in-part of U.S. patent application Ser. No. 16/586,099, filed on Sep. 27, 2019, the entire contents of which is hereby incorporated by reference.

BACKGROUND

Computer systems may run applications and processes that execute various instructions on a processor. Processors may execute instructions to perform tasks and complete work orders that may include instructions to read, write, and copy memory entries. The processors may use threads to complete tasks or work orders. Physical resources, such as a hardware thread (e.g., hyper-thread), may be associated with a processing core. Additionally, an operating system may schedule software threads. A software thread, which may be referred to as a thread of execution (or simply a thread) is a software unit. In a multi-processor/multi-core system, multiple threads can be executed in parallel. That is, each of the processors or cores may execute a thread simultaneously. One thread can pass a request to another thread to cause the request to be executed.

The various instructions may modify resources on the computer system, which may affect instructions from other processors or threads. For example, memory ordering may require memory barriers such as a read after a write memory barrier.

SUMMARY

The present disclosure provides new and innovative systems and methods for memory barrier elision for multi-threaded workloads. In an example, system includes a memory, at least one physical processor in communication with the memory, and a plurality of hardware threads executing on the at least one physical processor. A first thread of the plurality of hardware threads is configured to execute a plurality of instructions that includes a restartable sequence. Responsive to a different second thread in communication with the first thread being pre-empted while the first thread is executing the restartable sequence, the first thread is configured to restart the restartable sequence prior to reaching a memory barrier.

In an example, a method includes executing, by a first thread, a plurality of instructions that includes a restartable sequence. The method also includes receiving, by one of the first thread and a different second thread, an interrupt and pausing execution of the plurality of instructions due to the first thread being preempted. Responsive to the different second thread, in communication with the first thread, being preempted while the first thread is executing the restartable sequence, the method includes restarting the restartable sequence and continue executing the plurality of instructions prior to reaching a memory barrier.

In an example, a method includes executing, by a thread, a restartable portion of instructions to update a data structure. While executing the restartable portion, the method includes determining, by the thread, a status of the thread as one of (i) running on the same physical processor as a different thread and (ii) running on a different physical processor than the different thread. Responsive to determining the status as running on the same physical processor as the different thread, the method includes executing, by the thread, a read instruction within the restartable portion. Responsive to determining the status as running on a different physical processor, the method includes executing, by the thread, a read instruction after a write memory barrier by restarting the restartable portion of instructions.

In an example, a system includes a memory, at least one physical processor in communication with the memory, and a plurality of threads executing on the at least one physical processor. A first thread of the plurality of threads is configured to execute a restartable sequence to update a data structure, wherein an operating system scheduler updates a file in a directory, and the file includes a status of a second thread of the plurality of threads and an identification of a processor that the second thread is running on; receive a signal incident to an update to the file; responsive to receiving the signal, determine a status of the first thread as one of running on a same physical processor as the second thread, or running on a different physical processor than the second thread; and execute a read instruction based on the status of the first thread.

In an example, a method includes executing, by a first thread, a restartable sequence to update a data structure, wherein an operating system scheduler updates a file in a directory, and the file includes a status of a second thread of the plurality of threads and an identification of a processor that the second thread is running on; receiving, by the first thread, a signal incident to an update to the file; responsive to receiving the signal, determining a status of the first thread as one of running on a same physical processor as the second thread, or running on a different physical processor than the second thread; and executing, by the first thread, a read instruction based on the status of the first thread.

In an example, a non-transitory computer-readable storage medium storing instructions which, when executed by a first thread on a processor, cause the processor to execute a restartable sequence to update a data structure, wherein an operating system scheduler updates a file in a directory, and the file includes a status of a second thread of the plurality of threads and an identification of a processor that the second thread is running on; receive a signal incident to an update to the file; responsive to receiving the signal, determine a status of the first thread as one of running on a same physical processor as the second thread, or running on a different physical processor than the second thread; and execute a read instruction based on the status of the first thread.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Figure 1:
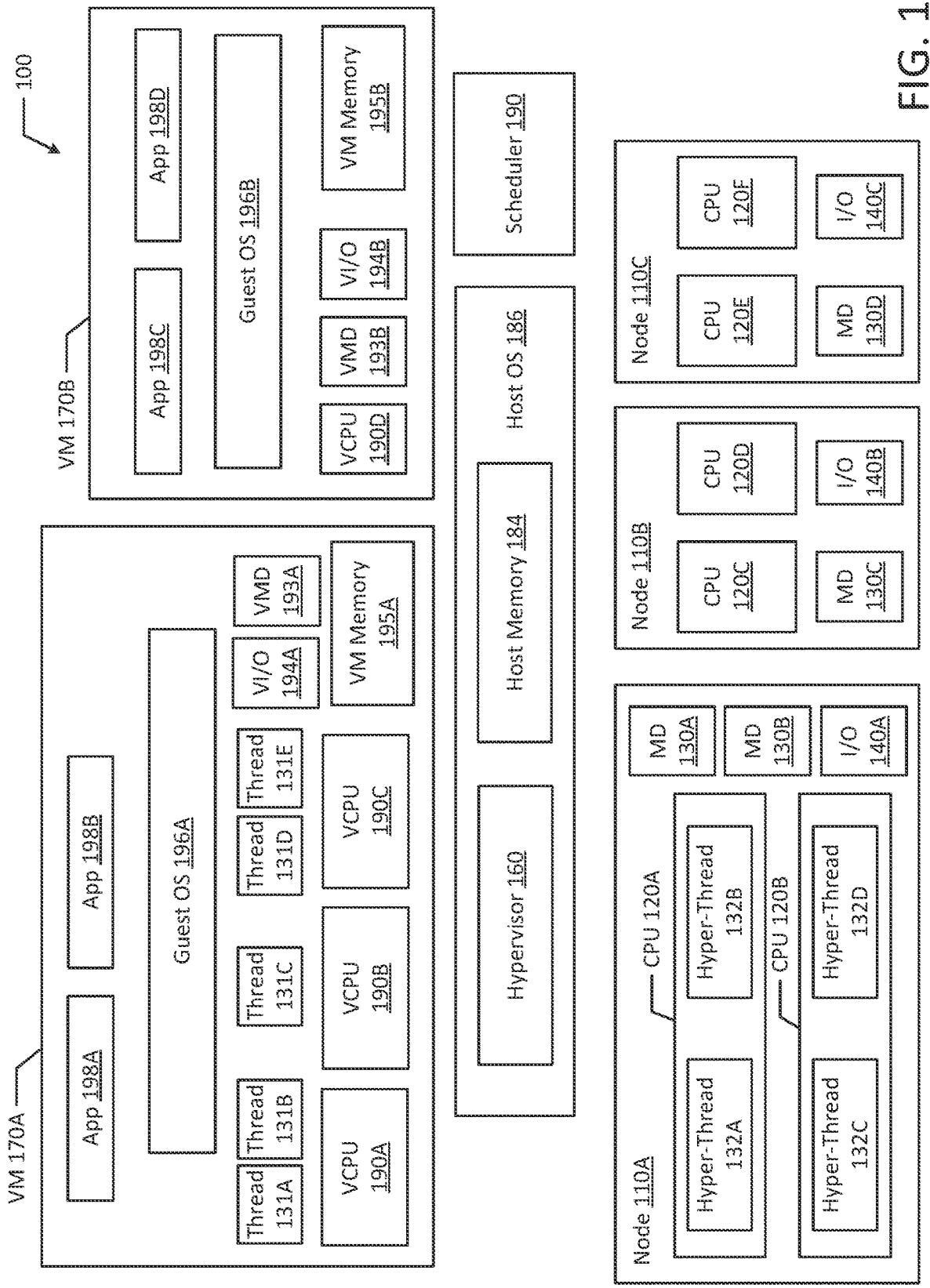
FIG. 1 illustrates a block diagram of an example computing system according to an example embodiment of the present disclosure.

Techniques are disclosed for memory barrier elision for multi-threaded workloads. Memory ordering overhead is often a major source of overhead in multi-threaded workloads. In particular, in modern processor architectures, communication strategies between threads running on different processors (e.g., CPUs) typically requires a computationally expensive read after write memory barrier (e.g., mfence) or an atomic operation. For example, on an x86 processor, the read after write memory barrier instruction may take hundreds of CPU cycles to operate. The memory ordering overhead affects multi-threaded programs on a supervisor as well as communications between a thread executing on VCPUs that run on different host CPUs. Additionally, the memory ordering overhead may affect communications between a VCPU and a hypervisor thread.

Memory ordering overhead also applies to lock-less instructions. For example, lock-less instructions, such as restartable sequences, may require a barrier. If an instruction sequence checks a value in memory to determine whether an interrupt is needed to notify another thread about more data, the instruction sequence (e.g., thread executing the instruction sequence) must execute a barrier before checking, and avoiding such a barrier is often impossible for many instruction sequences. Specifically, without executing the barrier, the read could occur speculatively. For example, a thread may access a memory value speculatively while the value is being modified or before the value is updated, thereby resulting in a dirty read.

To address the problems discussed above, an operating system or a supervisor may be extended to support a reverse restartable sequence of code, which may be a region of code that is tagged as atomic. The restartable sequence may be restarted when a thread has been preempted. Additionally, the restartable sequence may be restarted when another thread in communication with the thread executing the restartable sequence is preempted. If a thread is preempted, the operating system is extended to export information about which thread runs on which processor or CPU. For example, the operating system may export information that a thread is in a read-only section such as a virtual dynamic shared object ("VDSO"). If the preempted thread is a kernel thread, then the above information may be readily available.

However, the information regarding which thread runs on which processor or CPU may change immediately after it is read. For example, one software thread in communication with another software thread may receive stale information about the processor or CPU the other software thread is running on. To eliminate race conditions, a communication thread may check whether other communicating threads run on the same physical CPU, but as another hyper-thread (e.g., running on another logic CPU in a hyper-threaded configuration) or as another software thread. If the two hyper-threads or the two software threads run on the same CPU, then the read may be executed without a memory barrier because the physical CPU may not reorder reads, so a barrier is unnecessary in this case. Checking whether the threads run on the same CPU may be computationally inexpensive (e.g., a single CPU cycle), which is significantly less than the hundreds of CPU cycles that may be wasted executing a read after write memory barrier.

Conversely, if the communicating threads run on different physical CPUs, the thread executes a read after write memory barrier followed by a read to ensure that the read is not a speculative read or that the memory operations have not been reordered (e.g., resulting in a dirty read). In the scenario where the communicating threads run on different physical CPUs, the read instruction may have bypassed the write instruction if the sequence is restarted (e.g., possibly reading out of order or speculatively reading). However, since the read is safe to restart, the thread re-executes the restartable sequence. By performing the above check (e.g., whether the communicating threads execute on the same or different physical CPUs), the barrier is advantageously avoided in scenarios where the communicating threads execute on a single physical CPU, which advantageously prevents wasting CPU cycles on an unnecessary barrier. Specifically, hyper-threads (e.g., logical CPUs) that are part of the same physical CPU typically share cache and write buffers. As mentioned above, reads may not be reordered for threads (e.g., software threads, hyper-threads) running on the same physical CPU, but for threads running on different physical CPUs, reads may be reordered.

Vendors using a hypervisor (e.g., Kernel-based Virtual Machine ("KVM")) on an operating system, such as Red Hat® Enterprise Linux® ("RHEL") may utilize the systems and methods disclosed herein for communication between VCPUs and the hypervisor as this type of communication is often asynchronous. When handling network traffic (e.g., network traffic from a cloud computing platform such as the Red Hat® OpenStack® Platform), hypervisor vendors and operating system ("OS") vendors often attempt to improve networking speed for hypervisors for use in networking stacks. An example vendor is Red Hat®, which offers RHEL. By eliminating the computational cost of wasted CPU cycles for certain communication, performance may be improved. For example, hundreds of CPU cycles may be wasted performing an unnecessary read after write memory barrier compared to a single CPU cycle that may be used performing a check to avoid executing the read after write memory barrier.

FIG. 1 depicts a high-level component diagram of an example computing system 100 in accordance with one or more aspects of the present disclosure. The computing system 100 may include an operating system (e.g., host OS 186), one or more virtual machines (VM 170A-B), and nodes (e.g., nodes 110A-C).

The host operating system ("OS") 186 may also be referred to herein as supervisor 186. In an example, the supervisor may be a hypervisor or the host OS 186. Additionally, the host OS 186 may include the supervisor or a hypervisor 160. The supervisor 186 may be a program. For example, the supervisor 186 may be a program that constitutes the core of the host OS. As used herein, the supervisor 186 may refer to a privileged software component of the host OS. For example, the supervisor may have the ability to change memory mappings for an application (e.g., Application 198A-D). Additionally, the supervisor 186 may act as a controller of multiple processes including individual user processes within an application memory space. For example, the supervisor 186 may perform several tasks such as executing processes and handling interrupts. The supervisor 186 may also provide basic services such as memory management, process management, file management, and I/O management. In an example, the supervisor 186 may be a kernel or may be part of a kernel. Similarly, the system 100 may include a scheduler 190, which may have similar functions and features as supervisor 186. For example, the scheduler 190 may schedule task or threads (e.g., threads 131A-C or hyper-threads 132A-D), may execute processes and may handle interrupts.

The host OS or supervisor 186 may export information about which threads run on which processors (e.g., VCPU 190A-C and CPU 120A-F). The host OS or supervisor 186 may also notify threads (e.g., hyper-threads or software threads) of the CPU information (e.g., which threads are running on which CPUs). Information about which threads run on certain processors (e.g., the same processor as another thread or a different processor than another thread) advantageously allows a thread to execute a read without executing a read after write memory barrier in scenarios where the threads run on the same physical CPU, which prevents wasting CPU cycles on the computationally expensive read after write memory barrier operation.

Virtual machines 170A-B may include a guest OS, guest memory, a virtual CPU (VCPU), virtual memory devices (VMD), and virtual input/output devices (VI/O). For example, virtual machine 170A may include guest OS 196A, guest memory or virtual machine memory 195A, a virtual CPUs 190A-C, a virtual memory devices 193A, and virtual input/output device 194A. Virtual machine memory 195A may include one or more memory pages. Similarly, virtual machine 170B may include guest OS 196B, virtual machine memory 195B, a virtual CPU 190D, a virtual memory devices 193B, and virtual input/output device 194B. Virtual machine memory 195B may include one or more memory pages.

The computing system 100 may also include a hypervisor 160 and host memory 184. Hypervisor 160 may manage host memory 184 for the host operating system 186 as well as memory allocated to the virtual machines 170A-B and guest operating systems 196A-B such as guest memory or virtual machine memory 195A-B provided to guest OS 196A-B. Host memory 184 and virtual machine memory 195A-B may be divided into a plurality of memory pages that are managed by the hypervisor 180. Virtual machine memory 195A-B allocated to the guest OS 196A-B may be mapped from host memory 184 such that when a guest application 198A-D uses or accesses a memory page of virtual machine memory 195A-B, the guest application 198A-D is actually using or accessing host memory 184.

Software threads (e.g., threads 131A-E) may be created by an application or a program (e.g., App 198A-B) and may be scheduled by a guest OS (e.g., guest OS 196A). A software thread, which may be referred to as a thread of execution (or simply a thread 131) is a software unit. As illustrated in FIG. 1, each virtual processor 190A-C may run one or more threads 131A-E. For example, VCPU 190A may run threads 131A-B, VCPU 190B may run thread 131C, and VCPU 190C may run threads 131D-E. A thread or ordered sequence of instructions may allow the virtual processors to execute multiple instruction streams simultaneously. For example, VCPU 190A may simultaneously run two instruction streams on threads 131A-B. Threads 131 are shown for illustrative purposes, it should be understood that each VCPU 190A-D may execute more than two threads 131.

In an example, a virtual machine 170A may execute a guest operating system 196A and run applications 198A-B which may utilize the underlying VCPU 190A, VMD 192A, and VI/O device 194A. One or more applications 198A-B may be running on a virtual machine 170A under the respective guest operating system 196A. A virtual machine (e.g., VM 170A-B, as illustrated in FIG. 1) may run on any type of dependent, independent, compatible, and/or incompatible applications on the underlying hardware and OS. In an example, applications (e.g., App 198A-B) run on a virtual machine 170A may be dependent on the underlying hardware and/or OS 186. In another example embodiment, applications 198A-B run on a virtual machine 170A may be independent of the underlying hardware and/or OS 186. For example, applications 198A-B run on a first virtual machine 170A may be dependent on the underlying hardware and/or OS 186 while applications (e.g., application 198C-D) run on a second virtual machine (e.g., VM 170B) are independent of the underlying hardware and/or OS 186. Additionally, applications 198A-B run on a virtual machine 170A may be compatible with the underlying hardware and/or OS 186. In an example embodiment, applications 198A-B run on a virtual machine 170A may be incompatible with the underlying hardware and/or OS 186. For example, applications 198A-B run on one virtual machine 170A may be compatible with the underlying hardware and/or OS 186A while applications 198C-D run on another virtual machine 170B are incompatible with the underlying hardware and/or OS 186. In an example embodiment, a device may be implemented as a virtual machine (e.g., virtual machine 170A-B).

The computer system 100 may include one or more nodes 110A-C. Each node 110A-C may in turn include one or more physical processors (e.g., CPU 120A-F) communicatively coupled to memory devices (e.g., MD 130A-D) and input/output devices (e.g., I/O 140A-C). Each node 110A-C may be a computer, such as a physical machine and may include a device, such as hardware device. In an example, a hardware device may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. Virtual machines 170A-B may be provisioned on the same host or node (e.g., node 110A) or different nodes. For example, VM 170A and VM 170B may both be provisioned on node 110A. Alternatively, VM 170A may be provided on node 110A while VM 170B is provisioned on node 110B.

The processors (e.g., CPU 120A-F) may use threads to complete tasks or work orders. Physical resources, such as a hardware thread or hyper-thread 132A-D, may be associated with a processing core. For example, there may be a single hardware thread or hyper-thread 132A-D per core on a processor. In a multi-processor/multi-core system, multiple threads can be executed in parallel. That is, each of the processors or cores may execute a thread simultaneously. One thread can pass a request to another thread to cause the request to be executed. As illustrated in FIG. 1, the hypervisor 160 executing on a plurality of physical processors may execute a VCPU of a virtual machine which is executing on a first hyper-thread (e.g., hyper-thread 132A) of the physical processor or CPU 120A. The physical processor 120A may include hyper-threads 132A-B and physical processor 120B may include hyper-threads 132C-D. Virtual machines may execute in different hyper-threads of the same processor. For example, the virtual machine 170A may execute in hyper-thread 132A while virtual machine 170B executes in hyper-thread 132B of CPU 120A. Conversely, virtual machines may execute in hyper-threads of different processors. For example, the virtual machine 170A may execute in hyper-thread 132A of CPU 120A while virtual machine 170B executes in hyper-thread 132D of CPU 120B.

As used herein, physical processor or processor 120A-F refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). In a further aspect, a processor may provide a hyper-threading technology where a single physical processor may appear as two logical processors (e.g., hyper-threads 132A-B and hyper-threads 132C-D). In a processor (e.g., CPU 120A) using the hyper-threading technology, the physical processor resources are shared between the two logical processors and the architectural state is duplicated for the two logical processors (e.g., 132A and 132B). In an example, each processor may include more than two logical processors (e.g., three or four hyper-threads).

As discussed herein, a memory device 130A-D refers to a volatile or non-volatile memory device, such as RAM, ROM, EEPROM, or any other device capable of storing data. As discussed herein, I/O device 140A-C refers to a device capable of providing an interface between one or more processor pins and an external device capable of inputting and/or outputting binary data.

Processors 120A-F may be interconnected using a variety of techniques, ranging from a point-to-point processor interconnect, to a system area network, such as an Ethernet-based network. Local connections within each node, including the connections between a processor 120A-F and a memory device 130A-D may be provided by one or more local buses of suitable architecture, for example, peripheral component interconnect (PCI).

Figure 2:
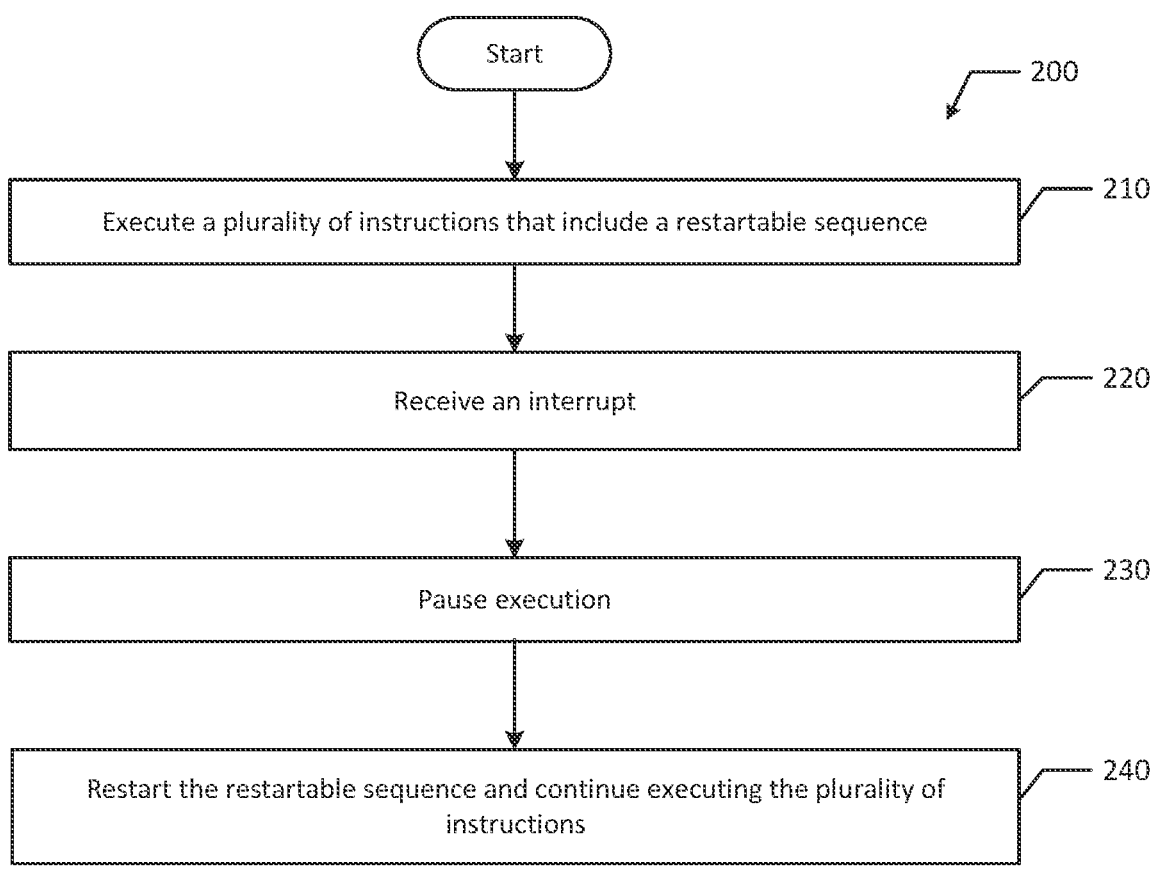
FIG. 2 illustrates a flowchart of an example process for memory barrier elision for multi-threaded workloads according to an example embodiment of the present disclosure.

FIG. 2 illustrates a flowchart of an example method 200 for memory barrier elision for multi-threaded workloads according to an example embodiment of the present disclosure. Although the example method 200 is described with reference to the flowchart illustrated in FIG. 2, it will be appreciated that many other methods of performing the acts associated with the method 200 may be used. For example, the order of some of the blocks may be changed, certain blocks may be combined with other blocks, blocks may be repeated, and some of the blocks described are optional. The method 200 may be performed by processing logic that may comprise hardware (circuitry, dedicated logic, etc.), software, or a combination of both.

The example method 200 includes executing a plurality of instructions that include a restartable sequence (block 210). In an example, the restartable sequence may be a portion or region of code that is tagged as atomic (e.g., an atomic range of instructions). For example, a first thread (e.g., a software thread 131A or a hyper-thread 132A) may execute a plurality of instructions. Additionally, the plurality of instructions may include a restartable sequence. In one example, the software thread 131A may execute a plurality of instructions. In another example, the hyper-thread 132A may execute the plurality of instructions. The method also includes receiving an interrupt (block 220). For example, the first thread (e.g., a software thread 131A or a hyper-thread 132A) or a different thread (e.g., a software thread 131B or a hyper-thread 132B) may receive an interrupt. Specifically, the software thread 131A may receive the interrupt. In another example, the hyper-thread 132A may receive the interrupt. Additionally, a different thread (e.g., a software thread 131B or a hyper-thread 132B) may receive the interrupt. The interrupt may preempt the thread that receives the interrupt.

Additionally, the method includes pausing execution (block 230). For example, the first thread (e.g., a software thread 131A or a hyper-thread 132A) or the different second thread (e.g., a software thread 131B or a hyper-thread 132B) may pause execution of the plurality of instructions due to the first thread being preempted. In an example, the software thread 131A may pause execution after being pre-empted. In another example, the software thread 131B may pause execution due to the software thread 131A being preempted. Additionally, hyper-thread 132A may pause execution after being preempted. A different hyper-thread, such as hyper-thread 132B may pause execution after hyper-thread 132A is preempted.

Then, method 200 includes restarting the restartable sequence and continuing execution of the plurality of instructions (block 240). For example, the different second thread (e.g., a software thread 131B or a hyper-thread 132B) may be in communication with the first thread (e.g., a software thread 131A or a hyper-thread 132A) and the different second thread may be preempted while the first thread is executing the restartable sequence. Responsive to the different second thread being preempted while the first thread is executing the restartable sequence, the first thread (e.g., a software thread 131A or a hyper-thread 132A) may restart the restartable sequence and continue executing the plurality of instructions prior to reaching a memory barrier. In an example, the first thread and the second thread may be software threads 131A and 131B respectively. In another example, the first thread and the second thread may be hyper-threads 132A and 132B respectively.

In an example, the restartable sequence may include a read instruction or a write instruction. The value of a data structure associated with the read instruction or the write instruction may depend on whether the different second thread (e.g., a software thread 131B or a hyper-thread 132B) in communication with the first thread (e.g., a software thread 131A or a hyper-thread 132A) is preempted before or after modifying the data structure. By restarting the restartable sequence if the second different thread is preempted, the system and methods disclosed here advantageously ensure that the most recent value of the data structure is used for the restartable portion of the instructions, which may advantageously eliminate race conditions since data may change immediately after it is read.

Figure 3:
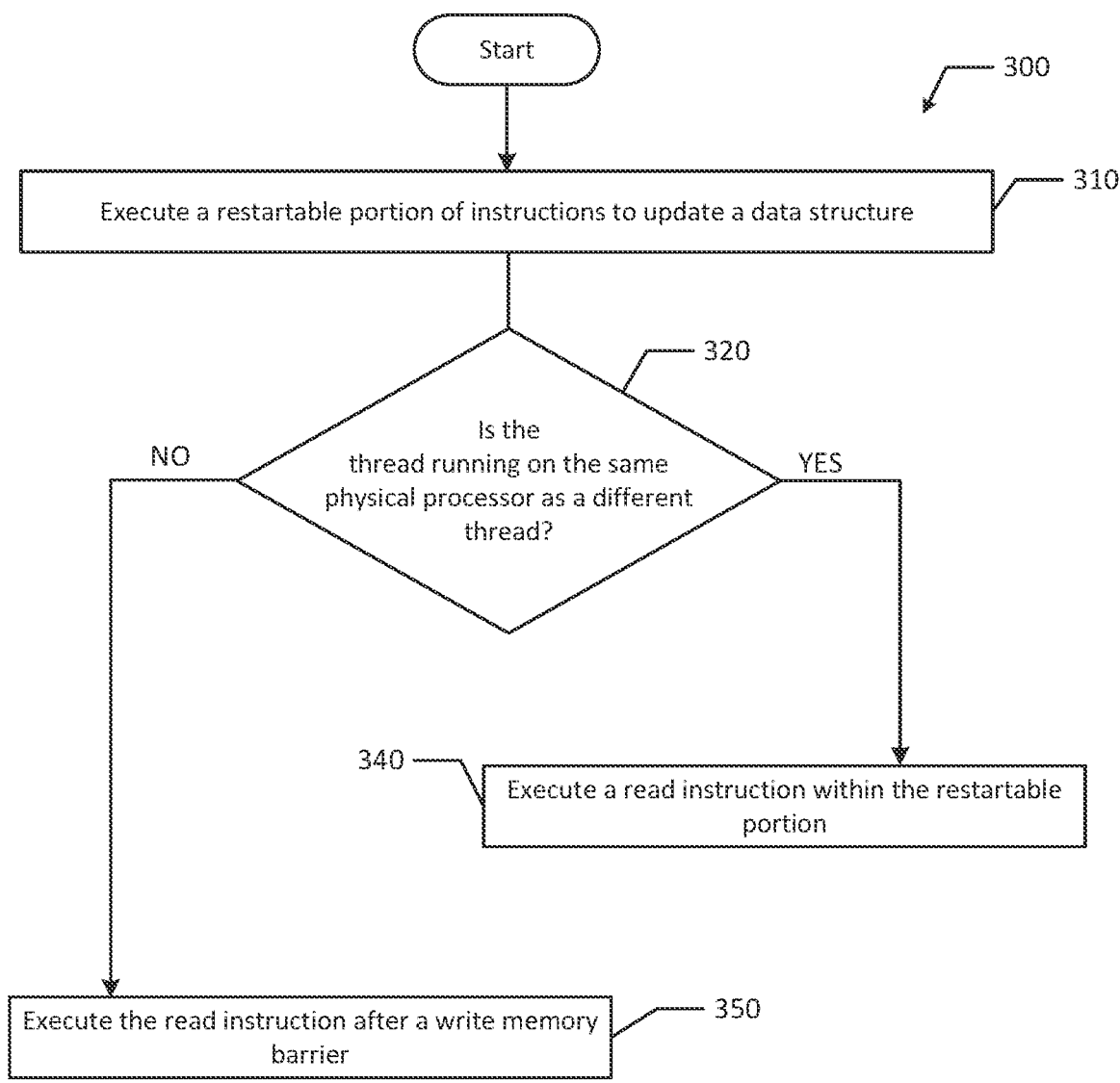
FIG. 3 illustrates a flowchart of an example process for memory barrier elision for multi-threaded workloads according to an example embodiment of the present disclosure.

FIG. 3 illustrates a flowchart of an example method 300 for memory barrier elision for multi-threaded workloads according to an example embodiment of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, blocks may be repeated, and some of the blocks described are optional. The method 300 may be performed by processing logic that may comprise hardware (circuitry, dedicated logic, etc.), software, or a combination of both.

The example method 300 includes executing a restartable portion of instructions to update a data structure (block 310). Similar to block 210 of method 200, a thread (e.g., a software thread 131A or a hyper-thread 132A) may execute a plurality of instructions that include a restartable portion. The restartable portion of the instructions may be to update a data structure. In an example, the thread may be a software thread 131A. In another example, the thread may be a hyper-thread 132A. The method also includes determining if the thread is running on the same physical processor as a different thread (block 320). Specifically, while executing the restartable portion, the thread (e.g., a software thread 131A or a hyper-thread 132A) may determine a status of the thread as either (i) running on the same physical processor (e.g., CPU 120A) as a different thread or (ii) running on a different physical processor (e.g., CPU 120B) than the different thread.

For example, the hyper-thread 132A may run on the same physical processor as the different hyper-thread 132B, such that both run on CPU 120. In another example, the hyper-thread 132A may run on a different physical processor as the different hyper-thread 132C, such that hyper-thread runs on CPU 120A and hyper-thread 132C runs on CPU 120B. Additionally, the threads may run on processors on different nodes (e.g., node 110A and node 110B). As discussed above, an operating system may export information about which threads run on certain processors (e.g., the same processor as another thread or a different processor than another thread).

If the thread is running on the same physical processor as the different thread, method 300 includes executing a read instruction within the restartable sequence (block 340). For example, responsive to determining the status as running on the same physical processor (e.g., CPU 120A) as the different thread (e.g., hyper-thread 132B), the thread (e.g., hyper-thread 132A) may execute a read instruction within the restartable portion. For example, by determining that both threads run on the same physical processor (e.g., CPU 120A), then the read instruction may be executed without a memory barrier because a physical CPU does not reorder reads and a barrier is unnecessary. Checking whether the threads run on the same CPU may be computationally inexpensive (e.g., a single CPU cycle), which is significantly less than the hundreds of CPU cycles that may be wasted executing an unnecessary read after write memory barrier.

If the thread is running on a different physical processor as the different thread, method 300 includes executing the read instruction after a write memory barrier (block 350). For example, responsive to determining the status as running on a different physical processor (e.g., CPU 120A) than the different thread (e.g., hyper-thread 132C running on CPU 120B), the thread (e.g., hyper-thread 132A) may execute a read instruction after a write memory barrier by restarting the restartable portion of instructions. For example, since different CPUs may re-order reads, the thread (e.g., hyper-thread 132A) executes a read after write memory barrier followed by a read to ensure that the read is not a speculative read or that the memory operations have not been reordered (e.g., resulting in a dirty read), which advantageously prevents a dirty read.

Figure 4A:
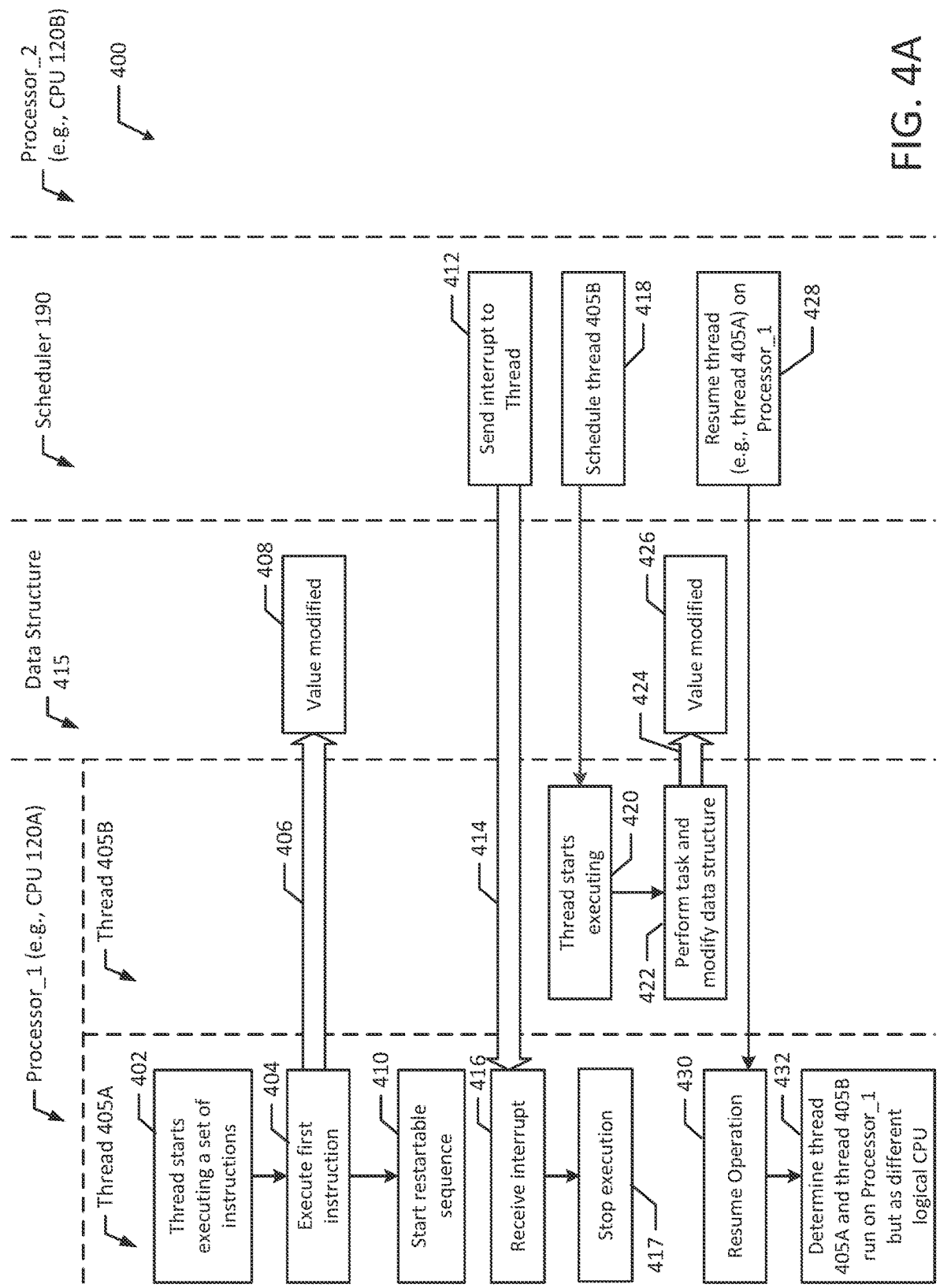
FIGS. 4A and 4B illustrate a flow diagram of an example process for memory barrier elision according to an example embodiment of the present disclosure.
Figure 4B:
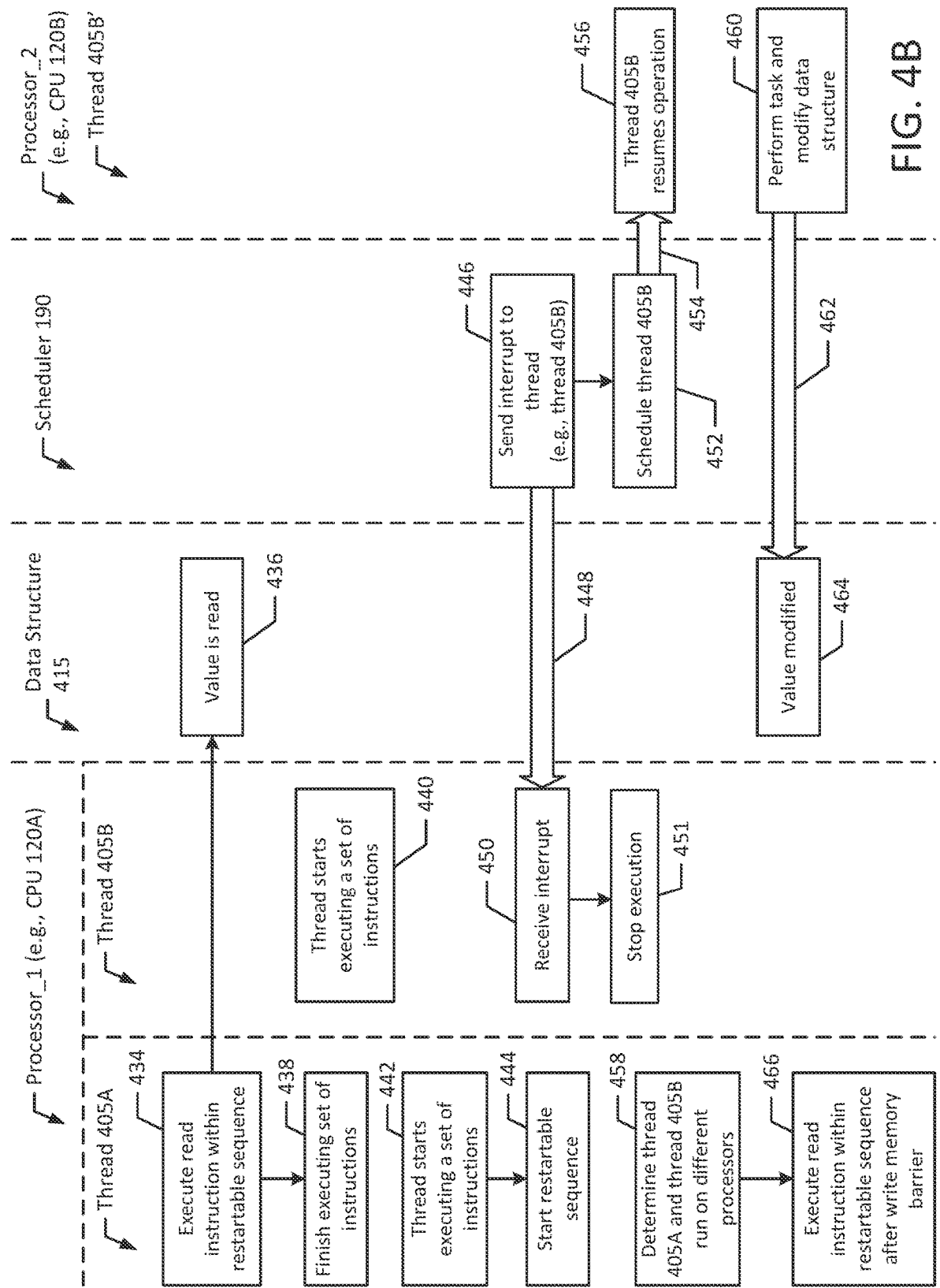

FIGS. 4A and 4B illustrate a flowchart of an example method 400 for reverse restartable sequences for memory barrier elision in accordance with an example embodiment of the present disclosure. Although the example method 400 is described with reference to the flowchart illustrated in FIGS. 4A and 4B, it will be appreciated that many other methods of performing the acts associated with the method 400 may be used. For example, the order of some of the blocks may be changed, certain blocks may be combined with other blocks, blocks may be repeated, and some of the blocks described are optional. For example, a scheduler 190 may communicate with threads 405A and 405B, which may correspond to hyper-threads 132A, 132B and/or 132C. The threads 405A and 405B may communicate with a data structure 415 and the supervisor 186 to perform example method 400. The threads 405A-B in FIGS. 4A and 4B may be hyper-threads on the same CPU (e.g., CPU 120A) or different CPUs (e.g., CPU 120A and CPU 120B). Additionally, the threads 405A-B may be software threads on the same vCPU or different vCPUs.

In the illustrated example, thread 405A may start executing a set of instructions (block 402). Thread 405A may refer to a hardware thread or hyper-thread (e.g., hyper-thread 132A) or a software thread (e.g., thread 131A). At some point in the set of instructions, thread 405A may execute a first instruction to modify a data structure 415 (blocks 404 and 406). For example, the thread may modify a value in a database table. After executing the instruction, the data structure is modified (e.g., value is modified) (block 408). For example, an entry in the database table may be modified. Then, the thread 405A may start a restartable sequence (block 410). In an example, the restartable sequence may be an atomic section of the set of instructions.

Then, the scheduler 190 may send an interrupt to thread 405A (blocks 412 and 414) and thread 405A may receive the interrupt (block 416). After receiving the interrupt, thread 405A may pause or stop execution (block 417). For example, the interrupt may preempt the thread 405A. The scheduler 190 may schedule thread 405B (block 418). For example, thread 405A may be preempted so the scheduler 190 can schedule higher priority tasks or perform other work (e.g., via thread 405B). In an example, the thread 405B may start executing after thread 405A receives the interrupt. After being scheduled, thread 405B starts executing (block 420) and performs a task by modifying the data structure 415 (blocks 422 and 424). For example, thread 405B may modify an entry in the database table. Then, the value of the data structure 415 is modified (block 426).

The scheduler 190 may resume thread 405A on "processor_1" (e.g., CPU 120A). The scheduler 190 may reschedule the thread on the same CPU or a different CPU. After resuming operation (block 430), the thread 405A may determine that it runs on the same processor (e.g., CPU 120A) as thread 405B, but on different logical CPUs (e.g., as different hyper-threads on CPU 120A). Information regarding which processors run on which threads may be provided by the scheduler 190. In another example, the information may be provided by an operating system, such as the host OS 186.

Continuing on FIG. 4B, thread 405A may execute a read instruction within the restartable sequence (block 434). In the illustrated example, thread 405A may execute the read instruction without a read after write memory barrier (e.g., mfence) because both thread 405A and thread 405B run on the same physical CPU 120. Typically, a physical CPU does not reorder reads and a barrier is unnecessary. Determining whether the threads run on the same CPU may be computationally inexpensive (e.g., a single CPU cycle), which is significantly less than the hundreds of CPU cycles that may be wasted executing an unnecessary read after write memory barrier Then, the value of the data structure 415 is read (block 436). For example, the entry of the database table may be read without any type of memory barrier, which advantageously reduces memory management and ordering overhead associated with performing a read after write memory barrier. After reading the value, the thread 405A may finish executing the set of instructions (block 438).

Thread 405B may start executing a set of instructions (block 440). Thread 405A may also start executing a set of instructions (block 442) and may start executing a restartable sequence or restartable portion of the instructions (block 444). As discussed above, the restartable portion may be a portion of the instructions that are tagged as atomic. While the thread 405A is executing the restartable portion, scheduler 190 sends an interrupt to thread 405B (blocks 446 and 448). For example, the scheduler 190 may interrupt thread 405B to perform other work or to interrupt the thread so the thread can be rescheduled elsewhere (e.g., to evenly distribute threads across system resources). Then, thread 405B receives the interrupt (block 450) and stops execution (block 451) After the scheduler 190 interrupts thread 405B, the scheduler 190 schedules thread 405B on a different processor (e.g., CPU 120B) (blocks 452 and 454). For example, thread 405B may be rescheduled to a different processor (e.g., CPU 120A) to improve system efficiency. Then, thread 405B (illustrated as 405B' for running on CPU 120B instead of CPU 120A) resumes operation (block 456).

After thread 405B is rescheduled on CPU 120B, thread 405A may determine that thread 405A and thread 405B run on different processors (block 458). Information regarding which processors runs on which threads may be provided by the scheduler 190. In another example, the information may be provided by an operating system, such as the host OS 186. For example, in the illustrated example, thread 405A runs on CPU 120 and thread 405B' now runs on CPU 120B. The different processors may be different processors on the same node (e.g., node 110A). In another example, the different processors may be processors on different nodes (e.g., node 110A and node 110B). Because thread 405A and thread 405B run on different processors, thread 405A may have to wait to execute a read until a write memory barrier is completed. Thread 405B' may perform a task and modify the data structure 415 (blocks 460 and 462). For example, thread 405B may modify an entry in the database table. Then, the value of the data structure 415 is modified (block 464). After the data structure is written to, the thread 405A may then execute the read instruction within the restartable sequence according the write memory barrier (block 466).

Since the communicating threads 405A and 405B run on different physical CPUs, thread 405A executes a read after write memory barrier followed by a read to ensure that the read is not a speculative read or that the memory operations have not been reordered (e.g., resulting in a dirty read). Performing the check of whether the threads (e.g., thread 405A and thread 405B) run on the same processor is computationally inexpensive (e.g., a single CPU cycle) compared to the computational expense of executing a barrier in each scenario. However, as illustrated at block 434, in some cases, performing the check advantageously saves significant resources and improves performance by avoiding unnecessary barriers.

Typically, restartable sequences were applied in narrow scenarios. The systems and methods disclosed herein apply restartable sequences to read after write barriers such that the restartable sequences are more widely applicable to other use cases. Even though applying the restartable sequences to read after write barriers may cost an extra interrupt to another thread, preemption is typically rare enough that the additional computational cost is generally inconsequential.

Figure 5:
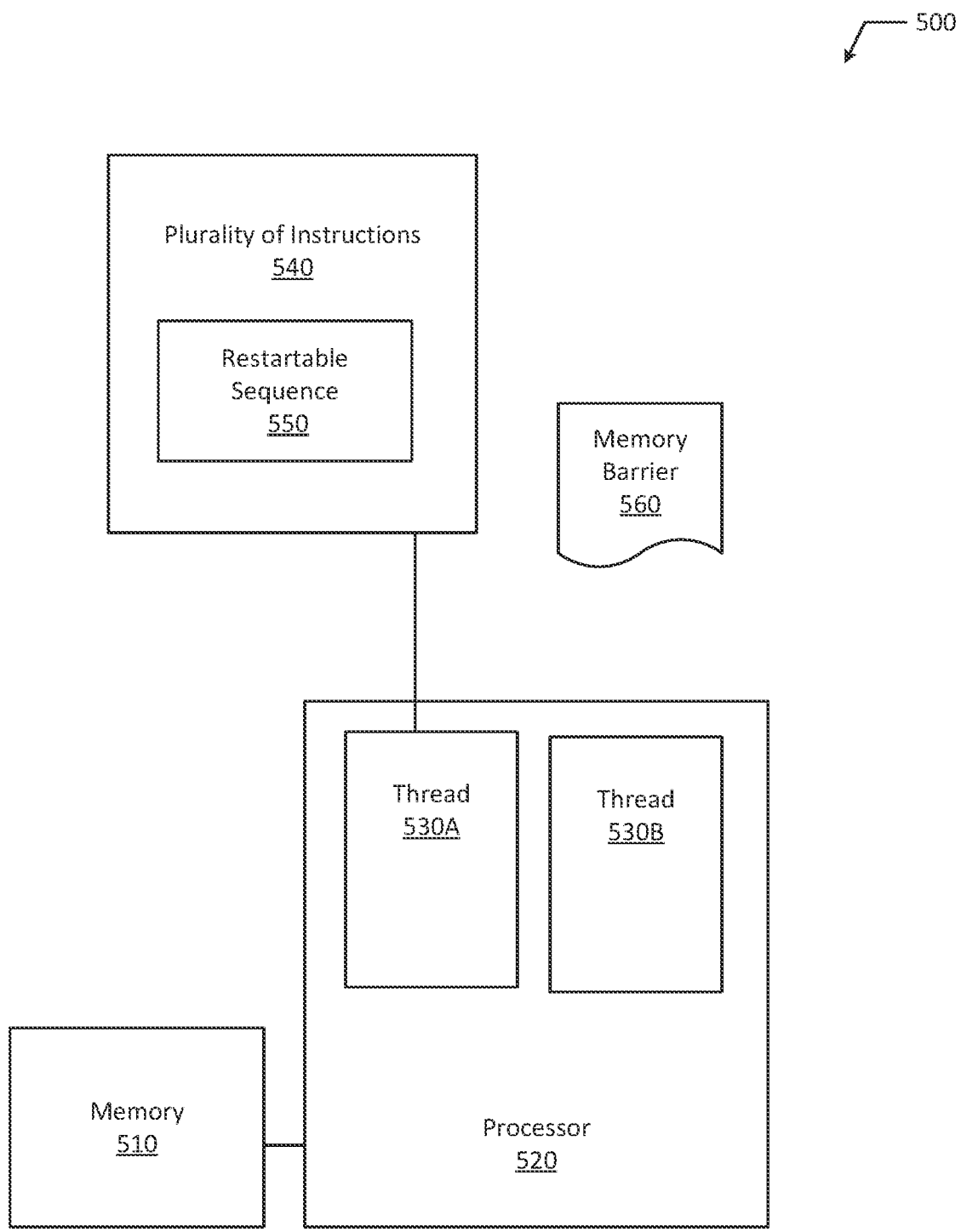
FIG. 5 illustrates a block diagram of an example memory barrier elision system according to an example embodiment of the present disclosure.

FIG. 5 is a block diagram of an example reverse restartable sequence system 500 according to an example embodiment of the present disclosure. System 500 includes a memory 510, at least one physical processor 520 in communication with the memory 510 and a plurality of hardware threads 530A-B executing on the at least one physical processor 520. A first thread 530A of the plurality of hardware threads 530A-B is configured to execute a plurality of instructions 540 that includes a restartable sequence 550. Responsive to a different second thread 530B in communication with the first thread 530A being pre-empted while the first thread 530A is executing the restartable sequence 550, the first thread 530A is configured to restart the restartable sequence 550 prior to reaching a memory barrier 560.

By restarting the restartable sequence 550 if the second different thread 530B is preempted, the system 500 advantageously ensures that dirty reads are avoided. For example, the restartable sequence 550 may be restarted if either thread 530A or thread 530B are preempted because both threads may be communicating with each other and may be accessing the same data.

Figure 6:
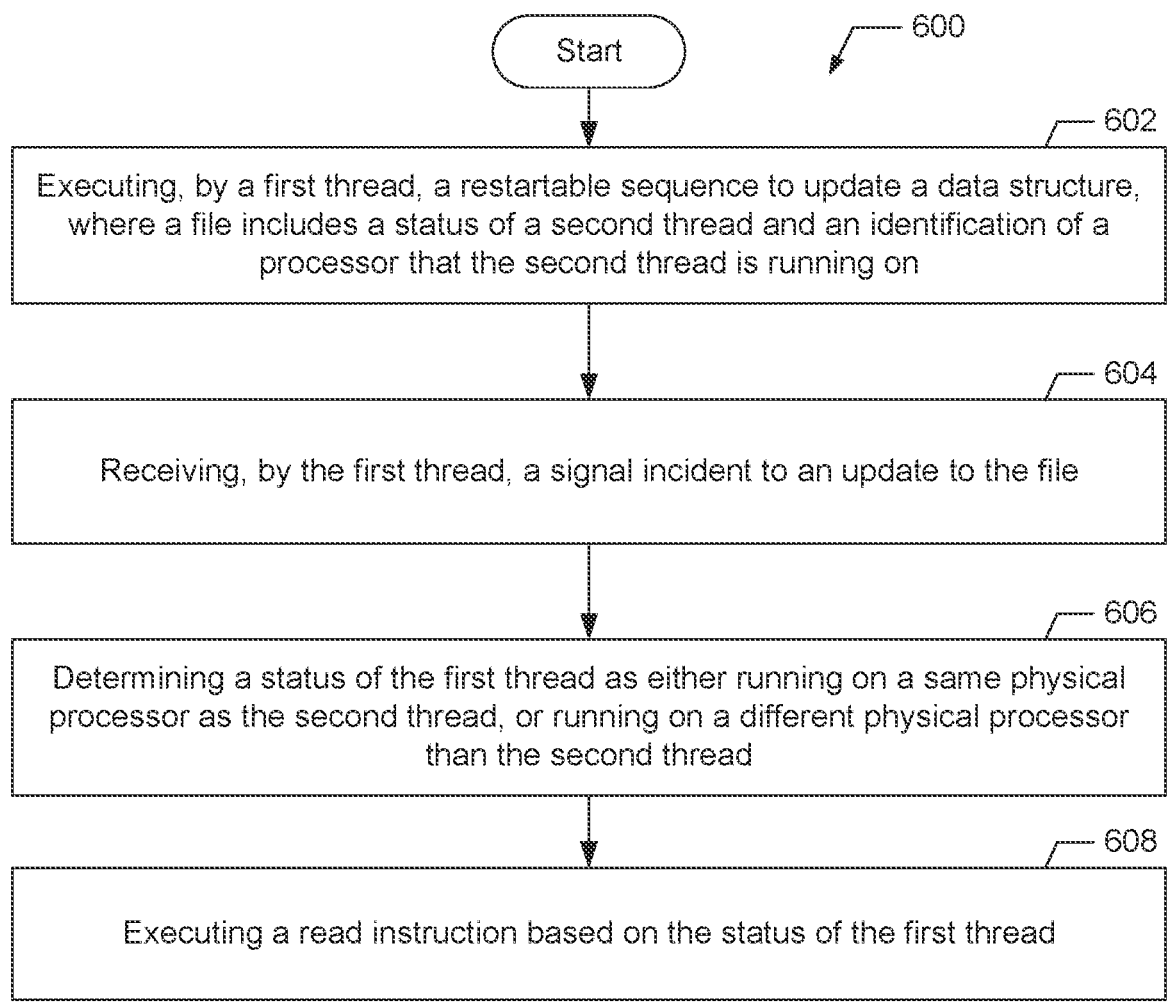
FIG. 6 illustrates a flowchart of an example process for memory barrier elision for multi-threaded workloads according to an example embodiment of the present disclosure.

FIG. 6 illustrates a flowchart of an example method 600 for memory barrier elision for multi-threaded workloads according to an example embodiment of the present disclosure. Although the example method 600 is described with reference to the flowchart illustrated in FIG. 6, it will be appreciated that many other methods of performing the acts associated with the method 600 may be used. For example, the order of some of the blocks may be changed, certain blocks may be combined with other blocks, blocks may be repeated, and some of the blocks described are optional. The method 600 may be performed by processing logic that may comprise hardware (circuitry, dedicated logic, etc.), software, or a combination of both.

The example method 600 may be performed by a first thread (e.g., a thread 131A) of a plurality of threads (e.g., 131A-E) that may execute on one or more physical processors (e.g., CPU 120A-F). The example method 600 includes executing a restartable sequence to update a data structure (block 602). In an example, while the first thread 131A is executing a restartable sequence to update a database that has data read by a second thread 131E, the second thread 131E is moved by an operating system scheduler (or OS scheduler) in order to move threads off of a physical CPU which is over-utilized, or to move threads onto a physical CPU that is under-utilized. In this example, the OS scheduler updates a file in a directory based on a change associated with the second thread 131E, such as a change in a status of the second thread 131E, or a change of the processor the thread 131E is running on such as when the thread moves to a different physical processor. The file includes a status of the second thread 131E and an identification of a processor that the second thread is running on (e.g., CPU 120A or CPU 120B). In an example, the status in the file may be running, sleeping, suspended, in process of being killed, etc. In an example, the file may be a Linux/proc filesystem file that supports the poll system call, and the directory may have a file for each thread, such that the respective files each show a thread status and a CPU running that particular thread. In an example, the processor that a thread (e.g., 131E) is running on may be a physical processor (e.g., CPU 120A-F), a logical processor (e.g., hyper-thread 132A-D), and/or a virtual processor (e.g., VCPU 190A-D). In an example, the identification of the processor running a thread (e.g., 131E) may include an indication of a physical processor, a logical processor, and a virtual processor.

The example method 600 may continue with the first thread receiving a signal incident to an update to the file (block 604). For example, based on an update to a thread's file, such as an update to a status (e.g., running changed to suspended) or an update to an identification of the processor of a thread (e.g., CPU 120A changed to CPU 120B or VCPU 190 changed to VCPU 190), a signal may be received from the OS scheduler. In an example, the first thread 131A receives the signal which indicates to the first thread 131A that the second thread 131E has changed from running on one processor (e.g., CPU 120B) to running on another processor (e.g., CPU 120A). For example, CPU 120B was over-utilized and/or CPU 120A was underutilized, so the OS scheduler moved the second thread 131E, updated the file stored in the directory, and sent the signal to the first thread 131A, and to any other threads registered to receive the signal when the second thread 131E has a change to its file.

The example method 600 may continue with determining a status of the first thread as either running on a same physical processor as the second thread, or running on a different physical processor than the second thread (block 606). For example, responsive to receiving the signal, the first thread 131A may determines that it is running on the same physical processor (e.g., 120A). In an alternative example, when the second thread 131E moves from CPU 120B to CPU 120A, the first thread 131A which is running on CPU 120B or CPU 120C determines that it is running on a different physical processor.

The example method 600 may continue with executing a read instruction based on the status of the first thread (block 608). In an example, the example method 600 and block 608 may be implemented as described with reference to example method 300 and block 320. In an example, in response to a status of the first thread 131A running on the same physical processor (e.g., CPU 120A) as the second thread 131E, the first thread 131A is configured to execute the read instruction within the restartable sequence without restarting the restartable sequence. The read instruction may be executed without restarting a restartable sequence which may include a memory barrier because a physical CPU does not reorder reads and the memory barrier is unnecessary. In this example, a write memory barrier may accordingly be omitted or skipped based on the status of the first thread 131A running on the same physical processor as the second thread 131E. Moreover, in some examples, determining the current status of a thread only takes a single CPU cycle. Thus, the possibility to omit a memory barrier, which may take hundreds of CPU cycles, and which typically creates multiple orders of magnitude longer delay (e.g., at least 100 times longer), is worthwhile even if a memory barrier is even relatively rarely omitted.

In another example, in response to the status of the first thread 131A running on the different physical processor (e.g., CPU 120A) than the second thread (e.g., on CPU 120C), the first thread is configured to execute the read instruction after a write memory barrier by restarting the restartable sequence, since different CPUs may re-order reads. This ensures that the read instruction will not result in a dirty read, although executing the memory barrier typically takes at least ten times longer (e.g., an order of magnitude longer), and often at least one hundred times longer (e.g., two orders of magnitude longer). In an example, the restartable sequence may include a first instruction, one or more intermediate instructions, and a final instruction, and for example, a write memory barrier in the restartable sequence may be after the first instruction and before the intermediate instructions, within intermediate instructions, or after the intermediate instructions and before a final instruction.

In an example, each thread of the plurality of threads (e.g., 131A-E) that includes one or more restartable sequences may register to receive signals based on file updates from the OS scheduler. For example, any thread which includes a restartable sequence may register to receive signals sent incident to changes in any related thread (e.g., 131A-E) to ensure dirty reads will not occur during later execution of instructions that include a restartable sequence. In an example, a file system component on a supervisor (e.g., OS scheduler) stores a list of threads that will receive signals as updates occur to the files in the directory. In an example, threads may self-register by requesting to be added to the list, or a supervisor may add threads to the list.

Figure 7:
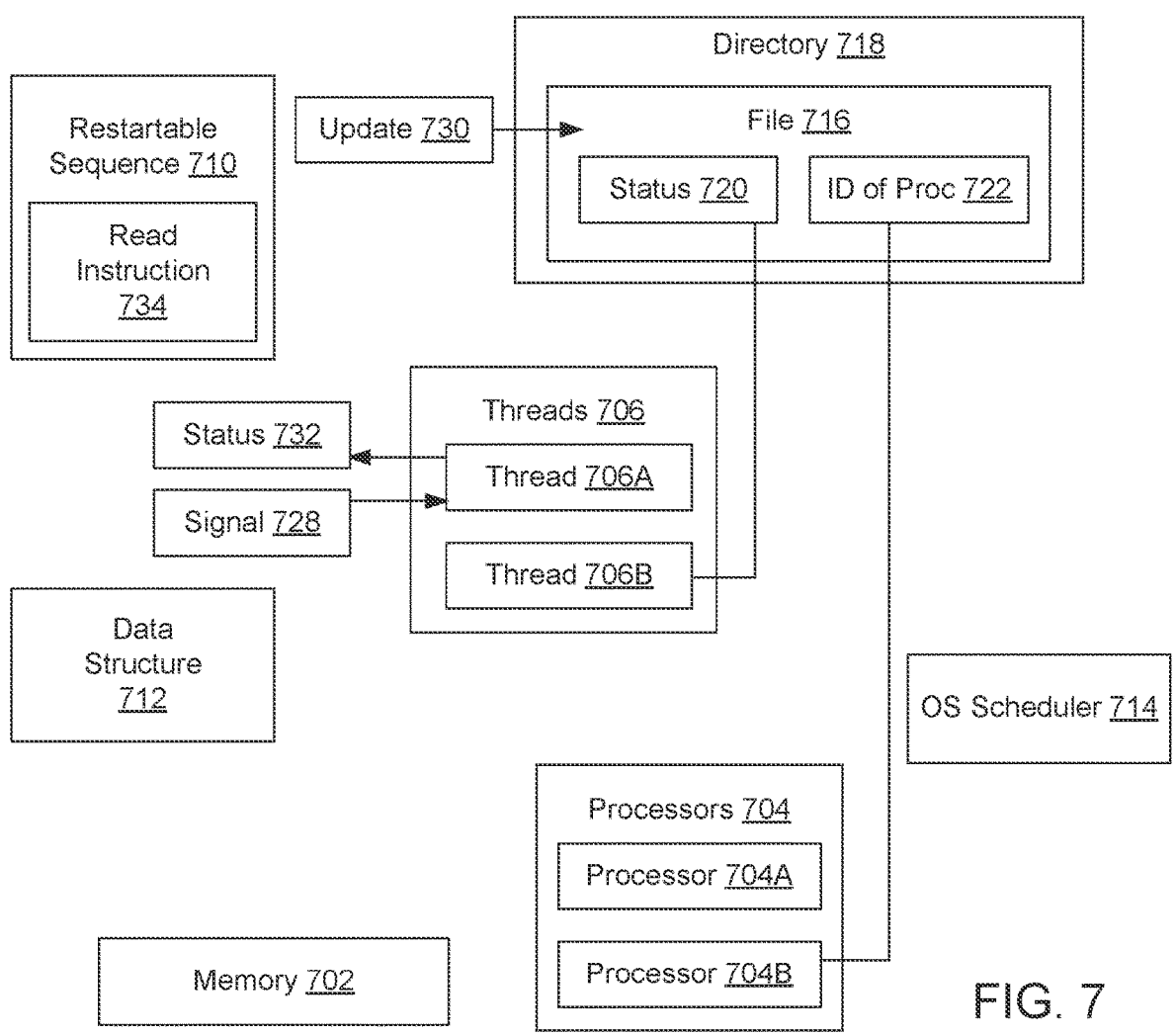
FIG. 7 illustrates a block diagram of an example memory barrier elision system according to an example embodiment of the present disclosure.

FIG. 7 illustrates a block diagram of an example memory barrier elision system 700 according to an example embodiment. The system 700 comprises a memory 702 and at least one physical processor 704 in communication with the memory 702. The system 700 has a plurality of threads 706 executing on the at least one physical processor 704. A first thread 706A of the plurality of threads is configured to execute a restartable sequence 710 to update a data structure 712. An operating system scheduler 714 may update a file 716 in a directory 718. The file 716 includes a status 720 of a second thread 706B of the plurality of threads 706. Also, the file 716 includes an identification 722 of a processor 704B that the second thread 706B is running on. The first thread 706A is configured to receive a signal 728 incident to an update 730 to the file 716. Responsive to receiving the signal 728, the first thread 706A is configured to determine a status 732 of the first thread 706A as either running on a same physical processor (e.g., 704B, 704A) as the second thread 706B, or running on a different physical processor (e.g., 704A, 704B) than the second thread 706B. The first thread 706A is configured to execute a read instruction 734 based on the status 732 of the first thread 706A. In an example, the first thread 706A and the second thread 706B are both software threads, and at any given time may run on different physical processors or the same physical processor, and may switch between the same and different processors one or more times while executing. In another example, one or both of the first thread 706A and the second thread 706B are hardware processor threads (e.g., PCPU threads) or logical processor threads (e.g., hyper-threads HT_1, HT_2). In an example, a plurality of instructions to be executed by the first thread 706A may include at least one restartable sequence 710 may be included as a portion of the plurality of instructions, and the restartable sequence 710 may be at the beginning, somewhere in the middle, or at the end of the plurality of instructions.

The present system enables userspace to optionally receive signals, and upon receiving a signal, restart any restartable sequences, which provides a computationally inexpensive process requiring minimal information from a supervisor or OS scheduler, while enabling substantial latency reductions through memory barrier elision and without risking dirty reads. Advantageously, when a signal is received, it does not really matter what happened to trigger the sending of the signal (e.g., a change that actually requires a restart of a restartable sequence, or a change that actually does not require a restart of the restartable sequence), the restartable sequence is restarted at minimal computational and latency cost, while sometimes providing substantial latency reductions (e.g., 10, 100, or 1,000 times latency reduction).

It will be appreciated that all of the disclosed methods and procedures described herein can be implemented using one or more computer programs or components. These components may be provided as a series of computer instructions on any conventional computer readable medium or machine-readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs, GPUs, hardware accelerators, or any other similar devices. The instructions may be configured to be executed by one or more processors, which when executing the series of computer instructions, performs or facilitates the performance of all or part of the disclosed methods and procedures.

Aspects of the subject matter described herein may be useful alone or in combination with one or more other aspects described herein. In a 1st exemplary aspect of the present disclosure a system includes a memory, at least one physical processor in communication with the memory, and a plurality of hardware threads executing on the at least one physical processor. A first thread of the plurality of hardware threads is configured to execute a plurality of instructions that includes a restartable sequence. Responsive to a different second thread in communication with the first thread being pre-empted while the first thread is executing the restartable sequence, the first thread is configured to restart the restartable sequence prior to reaching a memory barrier.

In accordance with a 2nd exemplary aspect of the present disclosure, which may be used in combination with any one or more of the preceding aspects (e.g., the 1st aspect), the restartable sequence includes a region of code that is tagged as atomic.

In accordance with a 3rd exemplary aspect of the present disclosure, which may be used in combination with any one or more of the preceding aspects (e.g., the 1st aspect), the restartable sequence is an atomic range of instructions.

In accordance with a 4th exemplary aspect of the present disclosure, which may be used in combination with any one or more of the preceding aspects (e.g., the 1st aspect), the plurality of instructions includes a read instruction to read a value after the restartable sequence.

In accordance with a 5th exemplary aspect of the present disclosure, which may be used in combination with any one or more of the preceding aspects (e.g., the 4th aspect), the restartable sequence includes a write instruction to modify the value.

In accordance with a 6th exemplary aspect of the present disclosure, which may be used in combination with any one or more of the preceding aspects (e.g., the 5th aspect), the first thread is configured to execute the read instruction without executing the memory barrier.

In accordance with a 7th exemplary aspect of the present disclosure, which may be used in combination with any one or more of the preceding aspects (e.g., the 1st aspect), the first thread and the different second thread execute on the same physical processor.

In accordance with an 8th exemplary aspect of the present disclosure, which may be used in combination with any one or more of the preceding aspects (e.g., the 1st aspect), the first thread and the different second thread execute on different physical processors of the at least one processor.

In accordance with a 9th exemplary aspect of the present disclosure, which may be used in combination with any one or more of the preceding aspects (e.g., the 1st aspect), the first thread is configured to resume operation on a different processor of the at least one processor.

In accordance with a 10th exemplary aspect of the present disclosure, which may be used in combination with any one or more of the preceding aspects (e.g., the 1st aspect), the first thread is configured to, responsive to the first thread being preempted while executing the restartable sequence, restart the restartable sequence upon resuming operation of the first thread prior to reaching a memory barrier.

Aspects of the subject matter described herein may be useful alone or in combination with one or more other aspects described herein. In an 11th exemplary aspect of the present disclosure a method includes executing, by a first thread, a plurality of instructions that includes a restartable sequence. The method also includes receiving, by one of the first thread and a different second thread, an interrupt and pausing execution of the plurality of instructions due to the first thread being preempted. Responsive to the different second thread, in communication with the first thread, being preempted while the first thread is executing the restartable sequence, the method includes restarting the restartable sequence and continue executing the plurality of instructions prior to reaching a memory barrier.

In accordance with a 12th exemplary aspect of the present disclosure, which may be used in combination with any one or more of the preceding aspects (e.g., the 11th aspect), the restartable sequence includes a region of code that is tagged as atomic.

In accordance with a 13th exemplary aspect of the present disclosure, which may be used in combination with any one or more of the preceding aspects (e.g., the 11th aspect), the restartable sequence is an atomic range of instructions.

In accordance with a 14th exemplary aspect of the present disclosure, which may be used in combination with any one or more of the preceding aspects (e.g., the 11th aspect), the plurality of instructions includes a read instruction to read a value after the restartable sequence.

In accordance with a 15th exemplary aspect of the present disclosure, which may be used in combination with any one or more of the preceding aspects (e.g., the 14th aspect), the restartable sequence includes a write instruction to modify the value.

In accordance with a 16th exemplary aspect of the present disclosure, which may be used in combination with any one or more of the preceding aspects (e.g., the 15th aspect), the first thread is configured to execute the read instruction without executing a barrier.

In accordance with a 17th exemplary aspect of the present disclosure, which may be used in combination with any one or more of the preceding aspects (e.g., the 11th aspect), the first thread and the different second thread execute on a physical processor.

In accordance with an 18th exemplary aspect of the present disclosure, which may be used in combination with any one or more of the preceding aspects (e.g., the 11th aspect), the first thread and the different second thread execute on different physical processors.

In accordance with a 19th exemplary aspect of the present disclosure, which may be used in combination with any one or more of the preceding aspects (e.g., the 11th aspect), the method further includes resuming, by the first thread, operation on a different processor.

In accordance with a 20th exemplary aspect of the present disclosure, which may be used in combination with any one or more of the preceding aspects (e.g., the 11th aspect), the method further includes responsive to the first thread being preempted while executing the restartable sequence, resuming execution, by the first thread, of the plurality of instructions by restarting the restartable sequence prior to reaching a memory barrier.

Aspects of the subject matter described herein may be useful alone or in combination with one or more other aspects described herein. In a 21st exemplary aspect of the present disclosure a non-transitory machine-readable medium stores code, which when executed by a processor, is configured to execute a plurality of instructions on a first hardware thread. The plurality of instructions includes a restartable sequence. The non-transitory machine-readable medium is also configured to receive an interrupt and pause execution of the plurality of instructions on the first hardware thread from the first hardware thread being preempted. Responsive to a different second thread in communication with the first hardware thread being preempted while the first hardware thread is executing the restartable sequence, the non-transitory machine-readable medium is configured to restart the restartable sequence and continue executing the plurality of instructions prior to reaching a memory barrier.

In accordance with a 22nd exemplary aspect of the present disclosure, which may be used in combination with any one or more of the preceding aspects (e.g., the 21st aspect), the restartable sequence includes a region of code that is tagged as atomic.

In accordance with a 23rd exemplary aspect of the present disclosure, which may be used in combination with any one or more of the preceding aspects (e.g., the 21st aspect), the restartable sequence is an atomic range of instructions.

In accordance with a 24th exemplary aspect of the present disclosure, which may be used in combination with any one or more of the preceding aspects (e.g., the 21st aspect), the plurality of instructions includes a read instruction to read a value after the restartable sequence.

In accordance with a 25th exemplary aspect of the present disclosure, which may be used in combination with any one or more of the preceding aspects (e.g., the 24th aspect), the restartable sequence includes a write instruction to modify the value.

In accordance with a 26th exemplary aspect of the present disclosure, which may be used in combination with any one or more of the preceding aspects (e.g., the 25th aspect), the first hardware thread is configured to execute the read instruction without executing a barrier.

In accordance with a 27th exemplary aspect of the present disclosure, which may be used in combination with any one or more of the preceding aspects (e.g., the 21st aspect), the first hardware thread and the different second thread execute on a physical processor.

In accordance with a 28th exemplary aspect of the present disclosure, which may be used in combination with any one or more of the preceding aspects (e.g., the 21st aspect), the first hardware thread and the different second thread execute on different physical processors.

In accordance with a 29th exemplary aspect of the present disclosure, which may be used in combination with any one or more of the preceding aspects (e.g., the 21st aspect), the non-transitory machine-readable medium is further configured to resume operation on a different processor.

Aspects of the subject matter described herein may be useful alone or in combination with one or more other aspects described herein. In a 30th exemplary aspect of the present disclosure a system includes a means for executing a plurality of instructions. The plurality of instructions includes a restartable sequence. The system also includes a means for receiving an interrupt, a means for pausing execution of the plurality of instructions and a means for resuming execution of the plurality of instructions by restarting the restartable sequence responsive to a first thread being preempted while executing the restartable sequence prior to reaching a memory barrier. Additionally, the system includes a means for restarting the restartable sequence and continuing execution of the plurality of instructions responsive to a different second thread in communication with the first thread being preempted while the first thread is executing the restartable sequence prior to reaching the memory barrier.

Aspects of the subject matter described herein may be useful alone or in combination with one or more other aspects described herein. In a 31st exemplary aspect of the present disclosure a system includes a memory and at least one processor in communication with the memory executing a first thread and a second thread. The second thread is configured to execute a restartable portion of instructions to update a data structure. While executing the restartable portion, the second thread is configured to determine a status as one of (i) running on the same physical processor as the first thread and (ii) running on a different physical processor as the first thread. Responsive to determining the status as running on the same physical processor as the first thread, the second thread is configured to execute a read instruction within the restartable portion. Responsive to determining the status as running on a different physical processor, the second thread is configured to execute the read instruction after a memory barrier by restarting the restartable portion of instructions.

In accordance with a 32nd exemplary aspect of the present disclosure, which may be used in combination with any one or more of the preceding aspects (e.g., the 31st aspect), the memory barrier is a write memory barrier.

In accordance with a 33rd exemplary aspect of the present disclosure, which may be used in combination with any one or more of the preceding aspects (e.g., the 31st aspect), the memory barrier is a fence.

In accordance with a 34th exemplary aspect of the present disclosure, which may be used in combination with any one or more of the preceding aspects (e.g., the 31st aspect), the restartable portion of instructions includes a region of code that is tagged as atomic.

In accordance with a 35th exemplary aspect of the present disclosure, which may be used in combination with any one or more of the preceding aspects (e.g., the 31st aspect), the restartable portion of instructions is an atomic range of instructions.

In accordance with a 36th exemplary aspect of the present disclosure, which may be used in combination with any one or more of the preceding aspects (e.g., the 31st aspect), the second thread is configured to pause execution of the restartable portion responsive to being preempted during execution of the restartable portion.

In accordance with a 37th exemplary aspect of the present disclosure, which may be used in combination with any one or more of the preceding aspects (e.g., the 36th aspect), the second thread is configured to resume operation on a different physical processor.

In accordance with a 38th exemplary aspect of the present disclosure, which may be used in combination with any one or more of the preceding aspects (e.g., the 36th aspect), the second thread is configured to resume operation on the same physical processor.

In accordance with a 39th exemplary aspect of the present disclosure, which may be used in combination with any one or more of the preceding aspects (e.g., the 36th aspect), the second thread is configured to determine the status after resuming operation.

In accordance with a 40th exemplary aspect of the present disclosure, which may be used in combination with any one or more of the preceding aspects (e.g., the 31st aspect), the second thread is configured to determine a second status as one of (i) running on a different hyper-thread as the first thread and (ii) running on the same hyper-thread as the first thread.

Aspects of the subject matter described herein may be useful alone or in combination with one or more other aspects described herein. In a 41st exemplary aspect of the present disclosure a method includes executing, by a thread, a restartable portion of instructions to update a data structure. While executing the restartable portion, the method includes determining, by the thread, a status of the thread as one of (i) running on the same physical processor as a different thread and (ii) running on a different physical processor than the different thread. Responsive to determining the status as running on the same physical processor as the different thread, the method includes executing, by the thread, a read instruction within the restartable portion. Responsive to determining the status as running on a different physical processor, the method includes executing, by the thread, a read instruction after a write memory barrier by restarting the restartable portion of instructions.

In accordance with a 42nd exemplary aspect of the present disclosure, which may be used in combination with any one or more of the preceding aspects (e.g., the 41st aspect), the method further includes determining, by the thread, a second status as one of (i) running on a different hyper-thread as the first thread and (ii) running on the same hyper-thread as the first thread.

In accordance with a 43rd exemplary aspect of the present disclosure, which may be used in combination with any one or more of the preceding aspects, a system includes a memory; at least one physical processor in communication with the memory; and a plurality of threads executing on the at least one physical processor configured to: execute, by a first thread, one or more first instructions at a first time instant that modifies a value of a data structure; execute, by the first thread, a plurality of second instructions at a second time instant that occurs after the first time instant, wherein the plurality of second instructions is different than the one or more first instructions, and wherein the plurality of second instructions is tagged as atomic; receive, by a second thread, an interrupt at a third time instant that occurs after the second time instant, wherein the second thread is different than the first thread, and wherein the first thread communicates with the second thread; responsive to second thread receiving the interrupt: pause, by the first thread, execution of the plurality of second instructions at the third time instant; and restart, by the first thread and at a fourth time instant that occurs after the third time instant, execution of the plurality of second instructions from the point at which the plurality of second instructions was executing at the second time instant prior to the first thread reaching a write memory barrier; and execute, after the fourth time instant by the first thread, a read instruction after the write memory barrier.

In accordance with another exemplary aspect of the present disclosure, which may be used in combination with any one or more of the preceding aspects, a system comprises: a memory; at least one physical processor in communication with the memory; and a plurality of threads executing on the at least one physical processor, wherein a first thread of the plurality of threads is configured to: execute a restartable sequence to update a data structure, wherein an operating system scheduler updates a file in a directory, and the file includes a status of a second thread of the plurality of threads and an identification of a processor that the second thread is running on; receive a signal incident to an update to the file; responsive to receiving the signal, determine a status of the first thread as one of running on a same physical processor as the second thread, or running on a different physical processor than the second thread; and execute a read instruction based on the status of the first thread.

In accordance with another exemplary aspect of the present disclosure, which may be used in combination with any one or more of the preceding aspects, in response to the status of the first thread being running on the same physical processor as the second thread, the first thread is configured to execute the read instruction within the restartable sequence without restarting the restartable sequence.

In accordance with another exemplary aspect of the present disclosure, which may be used in combination with any one or more of the preceding aspects, a write memory barrier is omitted based on the status of the first thread being running on the same physical processor as the second thread.

In accordance with another exemplary aspect of the present disclosure, which may be used in combination with any one or more of the preceding aspects, in response to the status of the first thread being running on the different physical processor than the second thread, the first thread is configured to execute the read instruction after a write memory barrier by restarting the restartable sequence.

In accordance with another exemplary aspect of the present disclosure, which may be used in combination with any one or more of the preceding aspects, determining the status takes a single CPU cycle.

In accordance with another exemplary aspect of the present disclosure, which may be used in combination with any one or more of the preceding aspects, executing a memory barrier takes at least one order of magnitude longer than determining the status of the first thread.

In accordance with another exemplary aspect of the present disclosure, which may be used in combination with any one or more of the preceding aspects, executing a memory barrier takes at least two orders of magnitude longer than determining the status of the first thread.

In accordance with another exemplary aspect of the present disclosure, which may be used in combination with any one or more of the preceding aspects, the first and second threads are both software threads.

In accordance with another exemplary aspect of the present disclosure, which may be used in combination with any one or more of the preceding aspects, the first and second threads run on different physical processors.

In accordance with another exemplary aspect of the present disclosure, which may be used in combination with any one or more of the preceding aspects, the first and second threads run on the same physical processor.

In accordance with another exemplary aspect of the present disclosure, which may be used in combination with any one or more of the preceding aspects, the processor that the second thread is running on is a physical CPU.

In accordance with another exemplary aspect of the present disclosure, which may be used in combination with any one or more of the preceding aspects, the processor that the second thread is running on is a logical CPU or a virtual CPU.

In accordance with another exemplary aspect of the present disclosure, which may be used in combination with any one or more of the preceding aspects, each thread of the plurality of threads that includes one or more restartable sequences registers to receive signals based on file updates from the operating system scheduler.

In accordance with another exemplary aspect of the present disclosure, which may be used in combination with any one or more of the preceding aspects, a method comprises: executing, by a first thread, a restartable sequence to update a data structure, wherein an operating system scheduler updates a file in a directory, and the file includes a status of a second thread of the plurality of threads and an identification of a processor that the second thread is running on; receiving, by the first thread, a signal incident to an update to the file; responsive to receiving the signal, determining a status of the first thread as one of running on a same physical processor as the second thread, or running on a different physical processor than the second thread; and executing, by the first thread, a read instruction based on the status of the first thread.

In accordance with another exemplary aspect of the present disclosure, which may be used in combination with any one or more of the preceding aspects, in response to the status of the first thread being running on the same physical processor as the second thread, the first thread is configured to execute the read instruction within the restartable sequence without restarting the restartable sequence.

In accordance with another exemplary aspect of the present disclosure, which may be used in combination with any one or more of the preceding aspects, a write memory barrier is omitted based on the status of the first thread being running on the same physical processor as the second thread.

In accordance with another exemplary aspect of the present disclosure, which may be used in combination with any one or more of the preceding aspects, in response to the status of the first thread being running on the different physical processor than the second thread, the first thread is configured to execute the read instruction after a write memory barrier by restarting the restartable sequence.

In accordance with another exemplary aspect of the present disclosure, which may be used in combination with any one or more of the preceding aspects, the first and second threads are both software threads.

In accordance with another exemplary aspect of the present disclosure, which may be used in combination with any one or more of the preceding aspects, the file includes identification of a plurality of processors including at least two of a physical CPU, a logical CPU, or a virtual CPU.

In accordance with another exemplary aspect of the present disclosure, which may be used in combination with any one or more of the preceding aspects, a non-transitory computer-readable storage medium stores instructions which, when executed by a first thread on a processor, cause the processor to: execute a restartable sequence to update a data structure, wherein an operating system scheduler updates a file in a directory, and the file includes a status of a second thread of the plurality of threads and an identification of a processor that the second thread is running on; receive a signal incident to an update to the file; responsive to receiving the signal, determine a status of the first thread as one of running on a same physical processor as the second thread, or running on a different physical processor than the second thread; and execute a read instruction based on the status of the first thread.

To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
a memory;
a plurality of physical processors in communication with the memory;
a restartable sequence of instructions;
a data structure;
an operating system scheduler;
a file directory; and
a plurality of threads executing on the plurality of physical processors, wherein a first thread of the plurality of threads is configured to:
execute the restartable sequence of instructions, wherein the execution updates the data structure, the operating system scheduler updates a file in the file directory based on a change associated with a second thread of the plurality of threads, and the file includes a status of the second thread and an identification of a physical processor of the plurality of physical processors that the second thread is executing on;
receive a signal incident to the update to the file; and
responsive to receiving the signal, execute a read instruction associated with the restartable sequence of instructions at a particular time, wherein the particular time is based on a status of the first thread, wherein the status of the first thread indicates that the first thread and the second thread are executing on a same physical processor of the plurality of physical processors, or indicates that the first thread and the second thread are executing on different physical processors of the plurality of physical processors.

2. The system of claim 1, wherein when the status of the first thread indicates that the first thread and the second thread are executing on the same physical processor, the first thread is configured to execute the read instruction within the restartable sequence of instructions without restarting the restartable sequence of instructions.

3. The system of claim 2, wherein a write memory barrier is omitted when the status of the first thread indicates that the first thread and the second thread are executing on the same physical processor.

4. The system of claim 1, wherein when the status of the first thread indicates that the first thread and the second thread are executing on the different physical processors, the first thread is configured to execute the read instruction after a write memory barrier by restarting the restartable sequence of instructions.

5. The system of claim 1, wherein the status of the second thread is one of executing, sleeping, suspended, and in process of being killed.

6. The system of claim 1, wherein executing a memory barrier takes a predetermined amount of time.

7. The system of claim 1, wherein the file is a Linux/proc filesystem file that supports a poll system call and the directory has a file for each thread.

8. The system of claim 1, wherein the first and second threads are both software threads.

9. The system of claim 8, wherein the first and second threads are executing on different physical processors.

10. The system of claim 8, wherein the first and second threads are executing on the same physical processor.

11. The system of claim 1, wherein the second thread is executing on a physical CPU.

12. The system of claim 1, wherein the second thread is executing on a logical CPU or a virtual CPU.

13. The system of claim 1, wherein each thread of the plurality of threads registers to receive signals based on file updates from the operating system scheduler.

14. A method executed by a first thread of a plurality of threads executing on a plurality of physical processors comprising:

executing a restartable sequence of instructions, wherein the executing updates a data structure, an operating system scheduler updates a file in a file directory based on a change associated with a second thread of the plurality of threads, the data structure is distinct from the file directory, and the file includes a status of the second thread and an identification of a physical processor of the plurality of physical processors that the second thread is executing on;

receiving a signal incident to the update to the file; and responsive to receiving the signal, executing a read instruction associated with the restartable sequence of instructions at a particular time, wherein the particular time is based on a status of the first thread, wherein the status of the first thread indicates that the first thread and the second thread are executing on a same physical processor of the plurality of physical processors, or indicates that the first thread and the second thread are executing on different physical processors of the plurality of physical processors.

15. The method of claim 14, wherein when the status of the first thread indicates that the first thread and the second thread are executing on the different physical processors, the first thread is configured to execute the read instruction after a write memory barrier by restarting the restartable sequence of instructions.

16. The method of claim 14, wherein the first and second threads are both software threads.

17. The method of claim 14, wherein the file includes identification of at least two of a physical CPU, a logical CPU, or a virtual CPU.

18. The method of claim 14, wherein when the status of the first thread indicates that the first thread and the second thread are executing on the same physical processor, the first thread is configured to execute the read instruction within the restartable sequence of instructions without restarting the restartable sequence of instructions.

19. The method of claim 18, wherein a write memory barrier is omitted when the status of the first thread indicates that the first thread and the second thread are executing on the same physical processor.

20. A non-transitory computer-readable storage medium storing instructions which, when executed by a first thread of a plurality of threads on a processor of a plurality of processors executing the plurality of threads, cause the processor to:

execute a restartable sequence of instructions, wherein the execution updates a data structure, an operating system scheduler updates a file in a file directory based on a change associated with a second thread of the plurality of threads, the data structure is distinct from the file directory, and the file includes a status of the second thread and an identification of a physical processor of the plurality of physical processors that the second thread is executing on;

receive a signal incident to the update to the file; and responsive to receiving the signal, execute a read instruction associated with the restartable sequence of instructions at a particular time, wherein the particular time is based on a status of the first thread, wherein the status of the first thread indicates that the first thread and the second thread are executing on a same physical processor of the plurality of physical processors, or indicates that the first thread and the second thread are executing on different physical processors of the plurality of physical processors.

* * * * *